United States Patent [19]

Murakawa et al.

[11] 4,289,523
[45] Sep. 15, 1981

[54] WORK TABLES IN APPARATUS FOR BLOWING HOLLOW GLASS ARTICLES

[75] Inventors: Takeyoshi Murakawa; Tetsuo Sakamoto, both of Shiga; Yutaka Oka, Otsu, all of Japan

[73] Assignee: Nippon Electric Glass Company, Limited, Otsu, Japan

[21] Appl. No.: 127,948

[22] Filed: Mar. 7, 1980

[51] Int. Cl.³ .............................................. C03B 7/16
[52] U.S. Cl. ....................................... 65/172; 65/224; 65/241
[58] Field of Search ............... 65/224, 229, 241, 261, 65/172, 173

[56] References Cited

U.S. PATENT DOCUMENTS 2,405,557  8/1946  Bonnefoy-Cudraz ............... 65/224
2,669,806  2/1954  Van De Walle et al. ............ 65/224
3,424,569  1/1969  Huebner ............................. 65/172
4,105,428  8/1978  Adams ............................... 65/229

Primary Examiner—Arthur D. Kellogg
Attorney, Agent, or Firm—Kurt Kelman

[57] ABSTRACT

A work table in a glass forming unit in apparatus for producing hollow glass articles has an orifice plate which is loosely fitted in a recess of the work table. Therefore, the orifice plate can be removed or mounted on the work table instantly while the orifice plate is firmly secured to the work table during the operation of the work table because the orifice plate expands by the heat of the handled molten glass to be friction-fitted in the recess. The orifice plate is formed of material having a coefficient of thermal expansion equal to, or relatively larger than, that of the work table.

3 Claims, 12 Drawing Figures

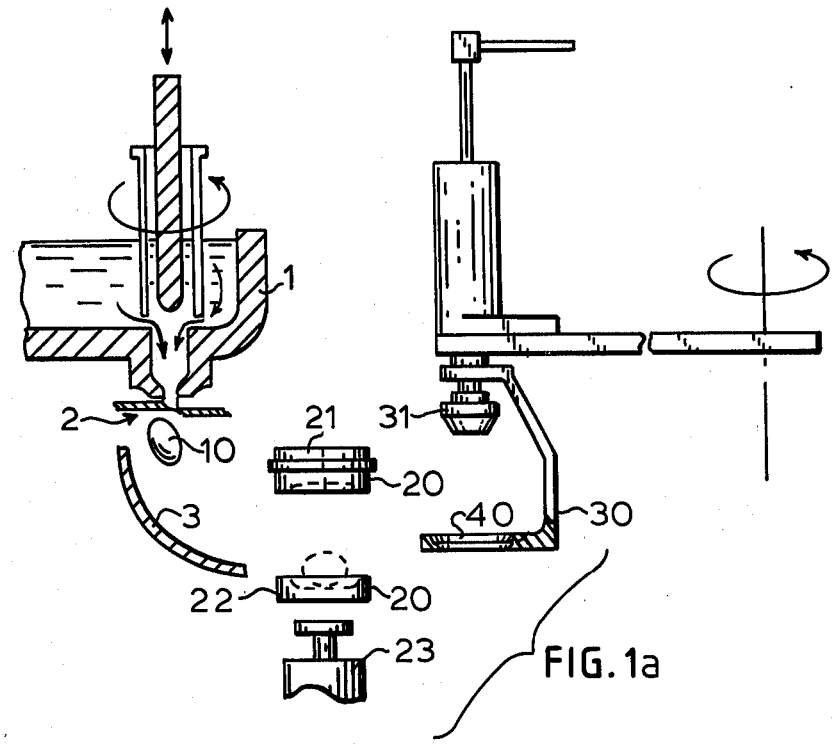
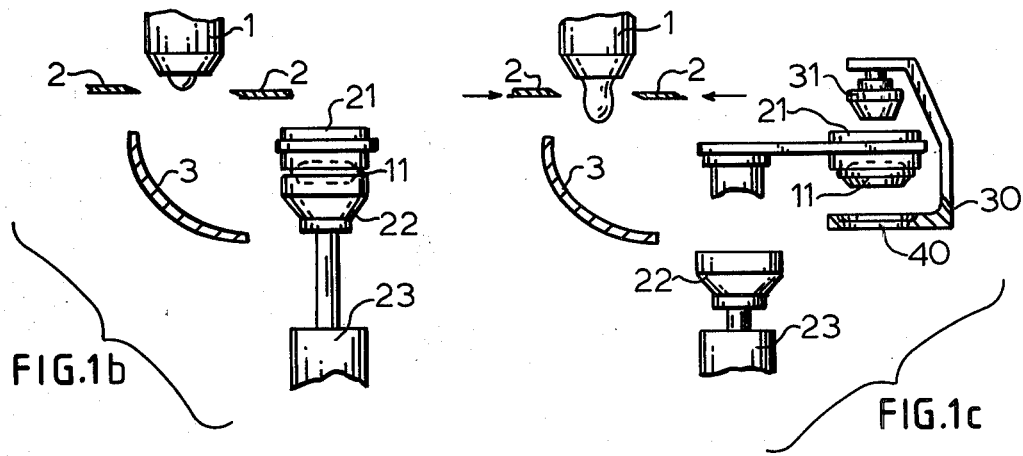
FIG. 1a
FIG. 1b
FIG. 1c

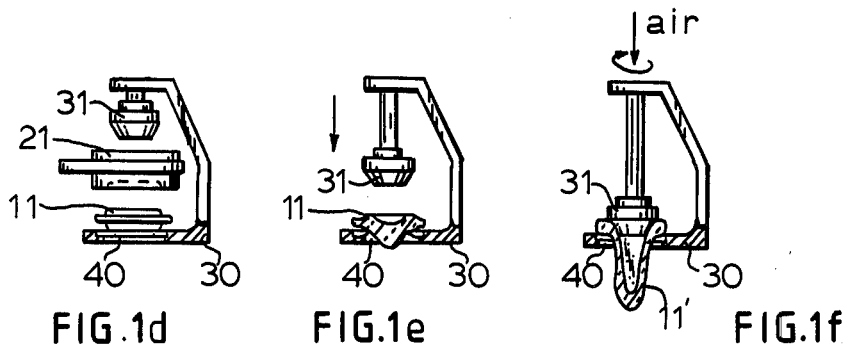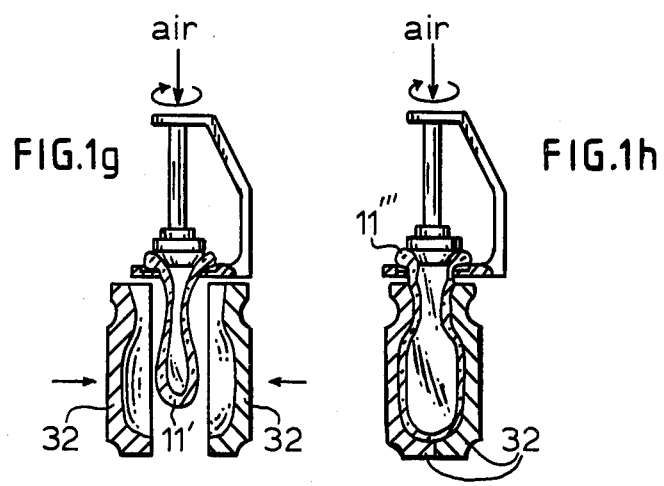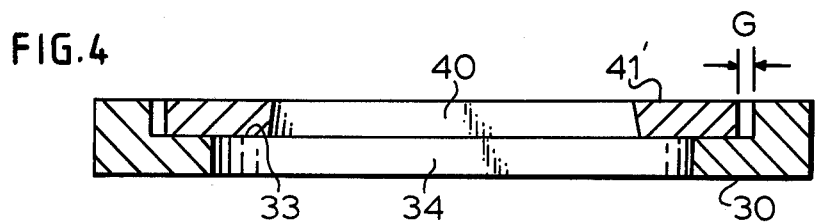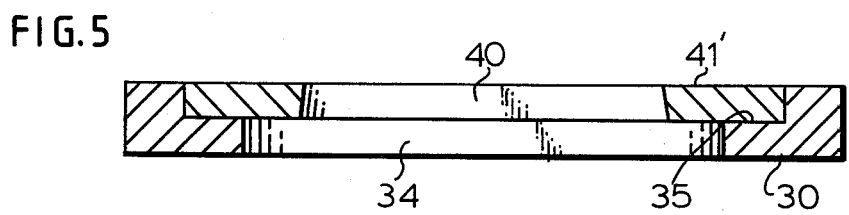

WORK TABLES IN APPARATUS FOR BLOWING HOLLOW GLASS ARTICLES

BACKGROUND OF THE INVENTION

This invention relates to apparatus for manufacturing hollow glass articles such as bulbs for heat-insulated bottles, electric glass bulbs and the like, and, in particular, to work tables used for supporting a charge of molten glass in glass forming machines in such apparatus.

A conventional apparatus for manufacturing hollow glass articles includes a glass feeder and a glass forming machine as shown in, for example, U.S. Pat. No. 2,405,557. The glass feeder is provided with a mechanical shearing device for severing a charge of glass and delivers periodically a charge of glass to the glass forming machine. The glass forming machine includes one or more blowing machines each having a work table, a blowing head and a blowing mold. The work table is formed with an orifice. The delivered charge of glass is received and supported on the work table and depends down through the orifice to form a hollow blank or a parison. The blowing head is brought into contact with the glass blank to enlarge the blank by blowing air into the interior of the parison through the blowing head and, therefore, the parison is blown in the blowing mold to a final shape.

The diameter of the orifice of the work table is determined in dependence on the dimension and shape of the intended hollow glass articles. Therefore, the conventional work table is provided with an orifice plate member having an orifice of a desired diameter and removably mounted thereon, in order to enable the production of hollow glass articles of different shapes and dimensions. Desired glass articles are manufactured by selecting a desired one from various orifice plate members having different diameters and fixing it onto the work table.

The orifice plate member must be removable from the work table to permit the replacement by another orifice plate member having an orifice of different diameter, but it must be fixedly secured to the work table for producing glass articles. To this end, in a conventional work table, the orifice plate is threaded on the outer peripheral surface, and is removably fixed by screwing into the mating screw tapped in the work table. However, the mounting and removal of the threaded orifice plate member is complicated.

In conventional automatic apparatus for manufacturing hollow glass articles, the glass forming apparatus includes a turn table on which a plurality of work tables, for example, 20 or more work tables are mounted. Therefore, it takes a long time to exchange orifice plates for producing different kinds of articles. Furthermore, when a damaged orifice plate is replaced by a new one, the turn table must be stopped for a certain time period sufficient to complete the replacement. This reduces the production efficiency.

Since the work table is in contact with molten glass and subjected to elevated high temperature during the operation, the orifice plate member often becomes attached to the work table. This further makes it difficult to remove the orifice plate member from the work table.

SUMMARY OF THE INVENTION

It is an object of this invention to provide an apparatus for manufacturing hollow glass articles which includes work tables wherein the exchange of orifice plates can be performed instantly.

According to this invention, an orifice plate member is prepared separately from the work table. The orifice plate member is made in an annular plate form having an inner diameter equal to that of a desired orifice and an outer diameter of a predetermined length. The work table is provided with a circular recess formed in the upper surface for receiving the orifice plate member therein and with a hole larger than the orifice formed at the center of the recess. The diameter of the circular recess is slightly larger than the outer diameter of the orifice plate member to form an annular gap therebetween. The annular gap is sufficient to permit the orifice plate member to loosely fit in the recess but is filled up by the thermal expansion of the orifice plate member due to the contact with the molten glass of an elevated temperature to fix the orifice plate member to the work table.

Therefore, the orifice plate member can be mounted or removed instantly. On the other hand, in operation, the orifice plate member is firmly secured to the work table by a friction fit due to the thermal expansion of the orifice plate member.

The orifice plate member and the work table can be made of the same material. Since the orifice plate member is in direct contact with the molten glass, the temperature of the orifice plate member reaches a higher temperature than the work table. Therefore, the orifice plate member can be firmly secured to the work table by a friction fit during the operation of the apparatus.

If the orifice plate member is made of materials different from the work table, it is desirable that the orifice plate member is made of material of a large coefficient of thermal expansion in relation to the material of the work table.

Further objects, features and other aspects of this invention will be understood from the following the detailed description of a preferred embodiment of this invention referring to the annexed drawings.

BRIEF DESCRIPTION OF THE DRAWINGS

FIGS. 1a–1h are diagrammatic views illustrating the operations of the conventional apparatus from the delivery of a charge of glass to the final blowing;

FIG. 4 is a sectional view of the embodiment of FIG. 3; and

FIG. 5 is a perspective view of the embodiment of FIG. 3 with the orifice plate member expanded by the heat of the molten glass.

DETAILED DESCRIPTION OF THE PREFERRED EMBODIMENT

Figure 2:
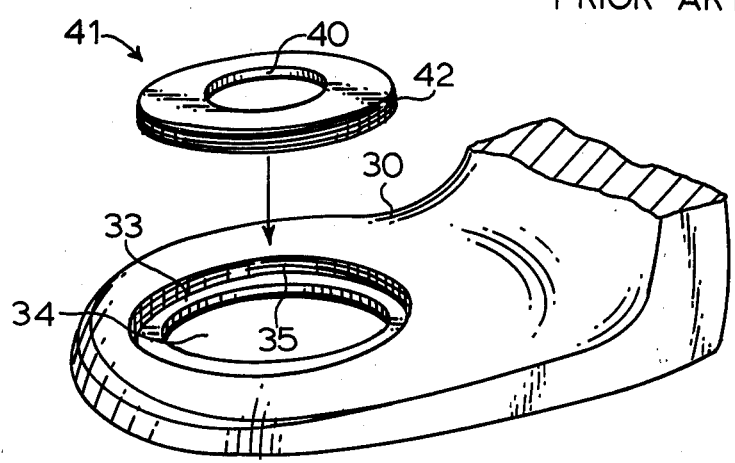
FIG. 2 is a perspective view of a known work table with a disassembled orifice plate member.

Before describing embodiments of this invention, a conventional method for producing hollow glass articles will be described referring to FIGS. 1a–1h.

In FIG. 1a, a glass feeder 1 includes a shearing device 2 for severing a charge of glass 10 from molten glass which is delivered to a blank mold unit 20 through a guide chute 3. Blank mold unit 20 includes an upper suction head 21, a lower mold 22 and an actuator 23. When the charge of glass 10 is delivered to lower mold 22, actuator 23 operates to push up lower mold 22 to suction head 21 to form the glass into a disk shape 11, as shown in FIG. 1b. Then, lower mold 22 is lowered by actuator 23 to the initial position while suction head 21 holds the disk shaped glass 11 by, for example, vacuum suction means (not shown), and carries it above an orifice 40 of a work table 30, as shown in FIG. 1c. The disk shaped glass 11 is placed on work table 30 over its orifice 40 by relieving the suction force of suction head 21, as shown in FIG. 1d. In FIG. 1e, the suction head is retracted to its initial position, and the disk shaped glass 11 gradually drops down through orifice 40 by gravity to form a hollow blank or a parison. An upper blowing head 31 is lowered into contact with the parison. Blowing head 31 firmly catches the peripheral portion of the parison 11' cooperating with the edge portion of orifice 40 of work table 30, as shown in FIG. 1f, and blows air into the interior of the parison 11' to expand the parison 11'. Before the parison 11' is expanded or lengthened to the dimensions of the cavity of a blow mold 32, the blow mold 32 is closed as shown in FIG. 1g. Then, the parison 11' is blown into a final shape in the mold as shown in FIG. 1h.

Thereafter, the blow mold 32 is opened, the shaped article 12 is taken out on a conveyer (not shown) after glass bead 11" surrounding orifice 40 has been cut away by a suitable cutting means (not shown).

As described hereinabove, the diameter of the orifice 40 is determined in dependence on the dimension and shape of the intended hollow glass articles. Therefore, various orifice plate members having different orifices are selectively fixed on the work table in the prior art.

Referring to FIG. 2, a known orifice plate 41 is threaded on the outer peripheral surface, as shown at 42. Work table 30 is provided with a circular recess 33 of a diameter equal to the outer diameter of orifice plate member 41, and with an opening 34 at the center portion of recess 33. Opening 34 is generally larger than orifice 40 of orifice plate member 41. Thread 35 is tapped in the peripheral surface of circular recess 33. Orifice plate 41 is fixed by screwing it into recess 33 of work table 30. But the screw connection between orifice plate member and work table requires a long time for removing and mounting the orifice plate member on the work table. Therefore, the apparatus is not efficiently used, as described hereinbefore.

This invention attempts to provide an arrangement for instantly mounting orifice plate member on the work table.

Figure 3:
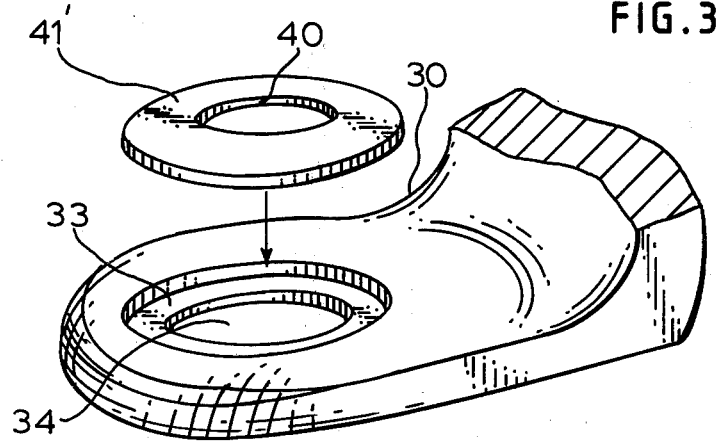
FIG. 3 is a perspective view of an embodiment of this invention.

Referring to FIGS. 3 and 4, orifice plate member 41' according to this invention is an annular plate having a central orifice 40 of a desired diameter, but the outer peripheral surface is not threaded. Work table 30 is also provided with circular recess 33 having a central opening 34. But the diameter of the recess 33 is selected to be larger than the outer diameter of orifice plate member 41' at room temperature, so that annular gap G, as shown in FIG. 4, is maintained between the outer peripheral surface of orifice plate member 41' and the inner peripheral surface of circular recess 33 of work table 30. Thus, orifice plate member 41' is loosely fitted in recess 33 of work table 30, so that orifice plate member 41' may be mounted on work table 30 merely by putting it in the recess, while it is instantly removed merely by picking it up it from the recess. Therefore, the mounting and the removal of the orifice plate member can be performed instantly.

Orifice plate member 41' is made of material of a relatively large coefficient of thermal expansion, and work table 30 is made of material of relatively low coefficient of thermal expansion, so that the annular gap G is filled up at a time when orifice plate 41' is heated by the molten glass put thereon, as shown in FIG. 5. Therefore, in operation of the apparatus, orifice plate member 41' can be firmly fixed in recess 33 of work table 30 because orifice plate member 41' is thermally friction-fitted in the recess.

A practical example of the orifice plate members and work table will now be described.

When orifice plate members having orifices of various diameters of 90–140 mm are made of a circular plate of carbon steel of S45C in JIS (Japanese Industrial Standards) which comprises 0.42–0.48% C, 0.15–0.35% Si, 0.6–0.9% Mn, up to 0.03% P, up to 0.035% S and the balance Fe, having an outer diameter of 190 mm and a thickness of 10 mm, the circular recess is formed to have a diameter of 190.04–190.06 mm so that the gap is 0.03–0.02 mm, if the work table is made of cast steel of SCMn2A in JIS which comprises 0.25–0.35% C, 0.3–0.6% Si, 1.0–1.6% Mn, up to 0.04% P, up to 0.04% S, and the balance Fe.

Since orifice plate member 41' is in direct contact with the delivered molten glass or parison 11, the temperature of the member is elevated higher than that of work table 30. Therefore, orifice plate member 41' is expanded more than work table 30 to be firmly secured even if orifice plate member 41' is made of the same materials as work table 30.

As will be noted from the above description, this invention uses the difference of the coefficient of thermal expansion between orifice plate member and work table to provide an improved arrangement for mounting the orifice plate member on the work table, wherein the orifice plate can be instantly mounted or removed merely by putting it on the table or picking it up. Therefore, the replacement of the orifice plate member is readily performed in a short time for exchanging articles to be produced or replacing a damaged orifice plate member by a new one without stopping the apparatus.

It will be easily understood that the outer contour of the orifice plate member is not necessarily circular but may be rectangular, polygonal or of other shapes. But it is required that the outer contour of the recess for receiving the orifice plate is similar to, but larger than, the outer contour of the orifice plate member.

This invention has been described in detail in connection with a preferred embodiment merely by way of example and this invention is not restricted thereto. It will be easily understood by those skilled in the art that variations and modifications can be easily made within the scope of this invention.

What is claimed is:

1. In a glass forming machine for forming hollow glass articles by blowing which includes a work table for receiving a charge of glass and having an orifice for permitting said received glass to depend downwardly therethrough, a blowing mold, and a blowing head for blowing the depended glass to form the hollow glass article cooperating with said blowing mold; the improvement which comprises an orifice plate member having a central opening of a diameter equal to that of a desired orifice, and said work table provided with a recess formed in the upper surface for receiving said orifice plate member therein and with a hole larger than said orifice formed at the center of said recess, the outer contour of said recess being similar to, and slightly larger than, said orifice plate member to form a gap along the circumference of said orifice plate member at room temperature, said gap being sufficient to permit said orifice plate member to loosely fit in said recess but to be filled up by the thermal expansion of said orifice plate member due to the contact with the delivered charge of glass of an elevated temperature to fix said orifice plate member to said work table.

2. The improvement as claimed in claim 1, wherein said orifice plate is an annular plate having a predetermined outer diameter, and said recess of said work table being a circular recess slightly larger than the outer diameter of said annular orifice plate member.

3. The improvement as claimed in claim 1, wherein said orifice plate member is made of material of a relatively large coefficient of thermal expansion and said work table is made of material of a relatively small coefficient of thermal expansion.

* * * * *